(12) United States Patent
McClure

(10) Patent No.: US 9,547,528 B1
(45) Date of Patent: *Jan. 17, 2017

(54) PIZZA SCHEDULER

(75) Inventor: Steven McClure, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1090 days.

This patent is subject to a terminal disclaimer.

(21) Appl. No.: 12/798,036

(22) Filed: Mar. 29, 2010

(51) Int. Cl.
*G06F 9/46* (2006.01)
*G06F 9/48* (2006.01)

(52) U.S. Cl.
CPC ................... *G06F 9/4881* (2013.01)

(58) Field of Classification Search
CPC ..................................... G06F 9/4881
See application file for complete search history.

(56) References Cited

U.S. PATENT DOCUMENTS

| | | | |
|---|---|---|---|
| 3,648,253 A | 3/1972 | Mullery et al. | |
| 4,989,133 A | 1/1991 | May et al. | |
| 5,247,677 A | 9/1993 | Welland et al. | |
| 5,287,508 A | 2/1994 | Hejna et al. | |
| 5,437,032 A | 7/1995 | Wolf et al. | |
| 5,517,643 A | 5/1996 | Davy | |
| 5,745,759 A | 4/1998 | Hayden et al. | |
| 5,974,438 A | 10/1999 | Neufeld | |
| 6,067,557 A | 5/2000 | Hegde | |
| 6,108,683 A | 8/2000 | Kamada et al. | |
| 6,108,741 A | 8/2000 | MacLaren et al. | |
| 6,304,891 B1 * | 10/2001 | Anderson et al. | 718/107 |
| 6,341,303 B1 | 1/2002 | Rhee et al. | |
| 6,397,262 B1 | 5/2002 | Hayden et al. | |
| 6,434,708 B1 | 8/2002 | Dunnihoo et al. | |
| 6,560,628 B1 | 5/2003 | Murata | |
| 6,668,269 B1 | 12/2003 | Kamada et al. | |
| 6,675,190 B1 | 1/2004 | Schabernack et al. | |
| 6,697,876 B1 | 2/2004 | van der Veen et al. | |
| 6,714,960 B1 | 3/2004 | Bitar et al. | |
| 6,785,889 B1 | 8/2004 | Williams | |
| 6,792,445 B1 | 9/2004 | Jones et al. | |
| 6,795,797 B2 | 9/2004 | Lee et al. | |
| 7,178,146 B1 | 2/2007 | McClure et al. | |
| 2002/0174164 A1 | 11/2002 | Hayashi | |
| 2003/0172104 A1 | 9/2003 | Hooman et al. | |
| 2004/0064817 A1 | 4/2004 | Shibayama et al. | |
| 2004/0244005 A1 | 12/2004 | Ancier | |

(Continued)

*Primary Examiner* — H S Sough
*Assistant Examiner* — Carina Yun
(74) *Attorney, Agent, or Firm* — Muirhead and Saturnelli, LLC

(57) ABSTRACT

Causing a processor to execute a plurality of tasks includes determining a count for each task to be executed, determining a total count representing a sum of all counts for all tasks to be included in a run list, and constructing the run list by distributing corresponding entries for each task within the run list a number of times in accordance with each task's weighting factor. The weighting factor corresponds to a ratio of the each task's count with respect to a total count. Causing a processor to execute a plurality of tasks may also include executing the tasks in the run list in a round-robin manner where a particular entry in the run list is skipped in response to a corresponding task having previously relinquished a slot prior to expiration of time allotted for the task to run in the slot.

19 Claims, 11 Drawing Sheets

(56) References Cited

U.S. PATENT DOCUMENTS

| | | |
|---|---|---|
| 2005/0071547 A1 | 3/2005 | Lin |
| 2005/0081200 A1* | 4/2005 | Rutten et al. .................. 718/100 |
| 2005/0120104 A1* | 6/2005 | Boon et al. ................... 709/223 |
| 2009/0187908 A1* | 7/2009 | He et al. ....................... 718/102 |

* cited by examiner

PIZZA SCHEDULER

BACKGROUND

1. Technical Field

This application relates to computer systems, and more particularly to scheduling tasks for execution in computer systems.

2. Description of Related Art

Computer systems may include an operating system providing for multi-tasking. Multi-tasking allows users to run multiple programs and gives the appearance that the computer system is executing all of the programs at the same time. The operating system performs multi-tasking by swapping tasks, processes, threads, and the like in and out of an execution or run state.

The operating system may schedule different tasks for execution in accordance with a variety of different criteria. For example, an operating system may schedule a new task for execution if a currently executing task is awaiting completion of a slow I/O operation. A new task may also be scheduled for execution interrupting a current task if the new task has a higher scheduling priority, or if the current task has run a completed time quantum or preset amount.

Drawbacks may exist with the amount of scheduling latency in connection with selecting and scheduling tasks for execution. For example, in connection with a priority-based scheme, the task with the highest priority of all tasks may be selected for execution. As the number of tasks in a "waiting for execution" state increases, the management and selection of the highest priority task may increase. Additionally, an embodiment may further implement an additional policy, such as an age policy, and also schedule a task for execution in connection with how long a task has been in the system, or waiting to execute. Taking into account the various criteria may increase the amount of time in scheduling latency especially as the number of tasks increases in a multi-tasking environment.

It is desirable to provide an efficient task scheduling technique that minimizes scheduling latency while being linearly scalable for use with any number of tasks. Such a technique is described, for example, in U.S. Pat. No. 7,178,146 (the '146 patent), which is assigned to the owner of the present application and incorporated by reference herein. In the '146 patent, each task to be executed is allotted a pie count representing the number of times out of the total run list each task is considered for scheduling. The total run list is the sum of all the pie counts for all tasks. Each time a task starts, exits, or has its pie count reset, the total number of pie counts is computed and tasks are distributed throughout the run list. Each task is distributed in the run list in accordance with its number of pie counts such that a minimum number of intervening tasks appears between each successive appearance of the same task. The scheduler then schedules tasks based on the run list.

The technique disclosed in the '146 patent reruns tasks in the run list without regard to the reason why the task relinquished control in the first place. Furthermore, using a single run list means that every task in the run list would be scheduled without regard to changing conditions or needs of the system. Accordingly, it is desirable to provide a system that addresses these issues.

SUMMARY OF THE INVENTION

According to the system described herein, causing a processor to execute a plurality of tasks includes determining a count for each task to be executed, determining a total count representing a sum of all counts for all tasks to be included in a run list, constructing the run list by distributing corresponding entries for each task within the run list a number of times in accordance with each task's weighting factor, the weighting factor corresponding to a ratio of the each task's count with respect to a total count, wherein at least one of the tasks has more than one corresponding entry in the run list and executing the tasks in the run list in a round-robin manner, where a particular entry in the run list is skipped in response to a corresponding task having previously relinquished a slot prior to expiration of time allotted for the task to run in the slot. Causing a processor to execute a plurality of tasks may also include executing a task in the run list in response to the particular entry being the entry from which the task had been executed when the task previously relinquished the slot prior to expiration of time allotted for the task to run in the slot. Causing a processor to execute a plurality of tasks may also include determining a first position and a second successive position of a first task in the run list such that a minimum number of other tasks intervene between the first position and the second successive position. Causing a processor to execute a plurality of tasks may also include computing an updated total count value replacing the total count upon detection of at least one of: a task start, a task completion and a reset of a task's count. Causing a processor to execute a plurality of tasks may also include distributing, in response to the computing, each task throughout the run list in accordance with the each task's weighting factor using the updated total count value and the each task's weighting factor. The run list may be used by a task scheduler included in a data storage system of the computer system. Computing and distributing are performed by invoking a routine. The run list may be one of: a single and a doubly linked list. Causing a processor to execute a plurality of tasks may also include constructing additional run lists by distributing corresponding entries for each task within the run list a number of times in accordance with each task's weighting factor. The run lists may be used according to a relative amount of CPU usage set for each run list.

According further to the system described herein, computer software, provided in a computer-readable medium, causes a processor to execute a plurality of tasks. The software includes executable code that determines a count for each task to be executed, executable code that determines a total count representing a sum of all counts for all tasks to be included in a run list, executable code that constructs the run list by distributing corresponding entries for each task within the run list a number of times in accordance with each task's weighting factor, the weighting factor corresponding to a ratio of the each task's count with respect to a total count, wherein at least one of the tasks has more than one corresponding entry in the run list, and executable code that causes the tasks in the run list to be executed in a round-robin manner, wherein a particular entry in the run list is skipped in response to a corresponding task having previously relinquished a slot prior to expiration of time allotted for the task to run in the slot. The computer software may also include executable code that causes a task in the run list to be executed in response to the particular entry being the entry from which the task had been executed when the task previously relinquished the slot prior to expiration of time allotted for the task to run in the slot. The computer software may also include executable code that determines a first position and a second successive position of a first task in the run list such that a minimum number of other tasks intervene between the first position and the second successive position. The computer software may also include executable code that computes an updated total count value replacing the total count upon detection of at least one of: a task start, a task completion and a reset of a task's count. The computer software may also include executable code that distributes, in response to the computing, each task throughout the run list in accordance with the each task's weighting factor using the updated total count value and the each task's weighting factor. The run list may used by a task scheduler that is included in a data storage system of the computer system. The run list may be one of: a single and a doubly linked list. The computer software may also include executable code that constructs additional run lists by distributing corresponding entries for each task within the run list a number of times in accordance with each task's weighting factor. The run lists may be used according to a relative amount of CPU usage set for each run list.

BRIEF DESCRIPTION OF THE DRAWINGS

Features and advantages of the system described herein will become more apparent from the following detailed description of exemplary embodiments thereof taken in conjunction with the accompanying drawings, as follows.

DETAILED DESCRIPTION OF VARIOUS EMBODIMENTS

Figure 1:
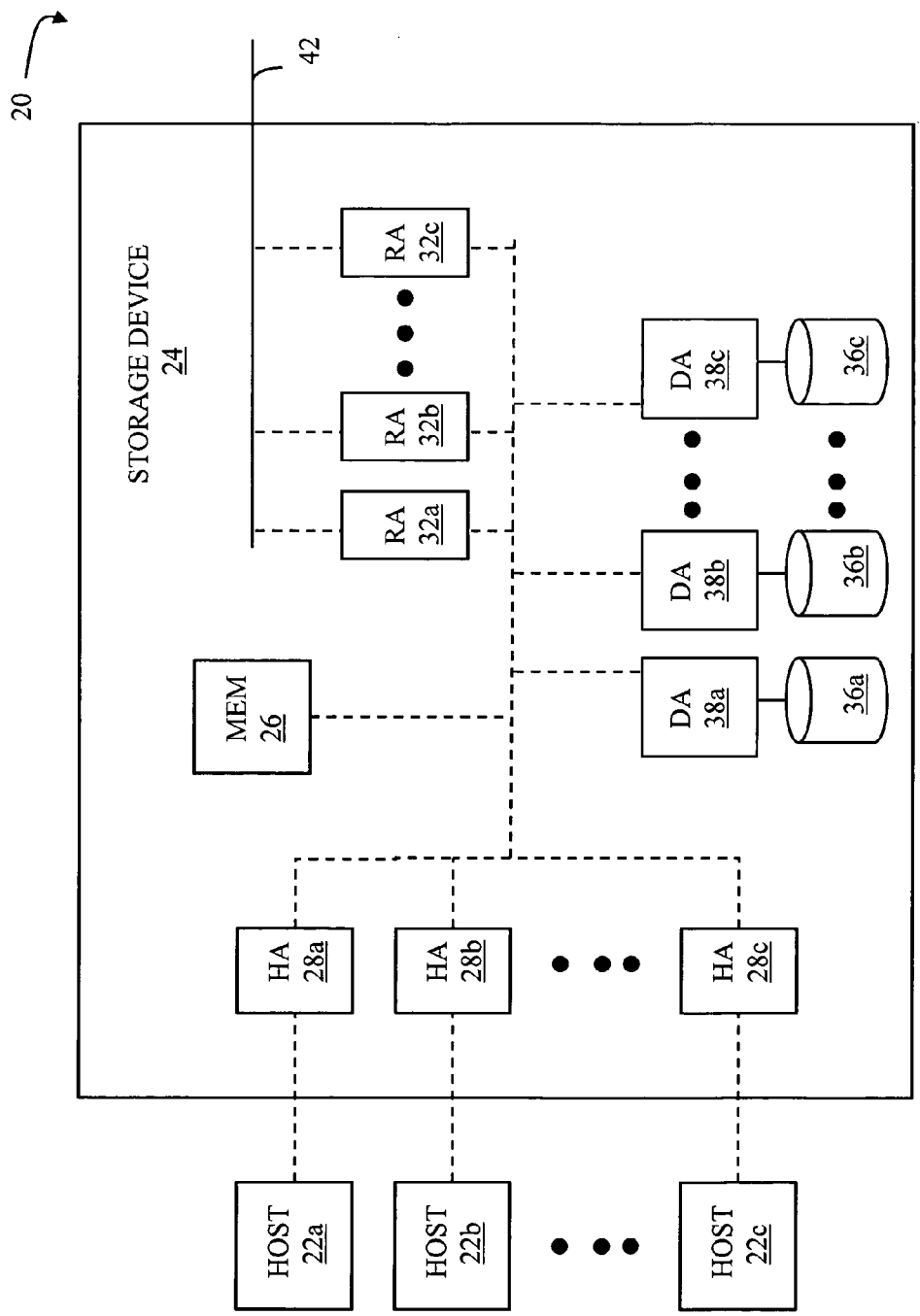
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more Remote Data Facility (RDF) adapter units (RA's) 32a-32c. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 42 and are similar to the HA's 28a-28c, but are used to transfer data between the storage device 24 and other storage devices (see FIG. 3 and corresponding discussion) that are also coupled to the RDF link 42. The storage device 24 may be coupled to additional RDF links (not shown) in addition to the RDF link 42. For further discussion of RDF and the use thereof in data recovery and storage techniques, see, for example, U.S. Pat. No. 5,742,792 to Yanai, et al., entitled "Remote Data Mirroring" and U.S. Patent App. Pub. No. 2006-0069887 to LeCrone, et al., entitled "Triangular Asynchronous Replication," both of which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in a computer readable storage medium and executed by one or more processors.

Figure 2:
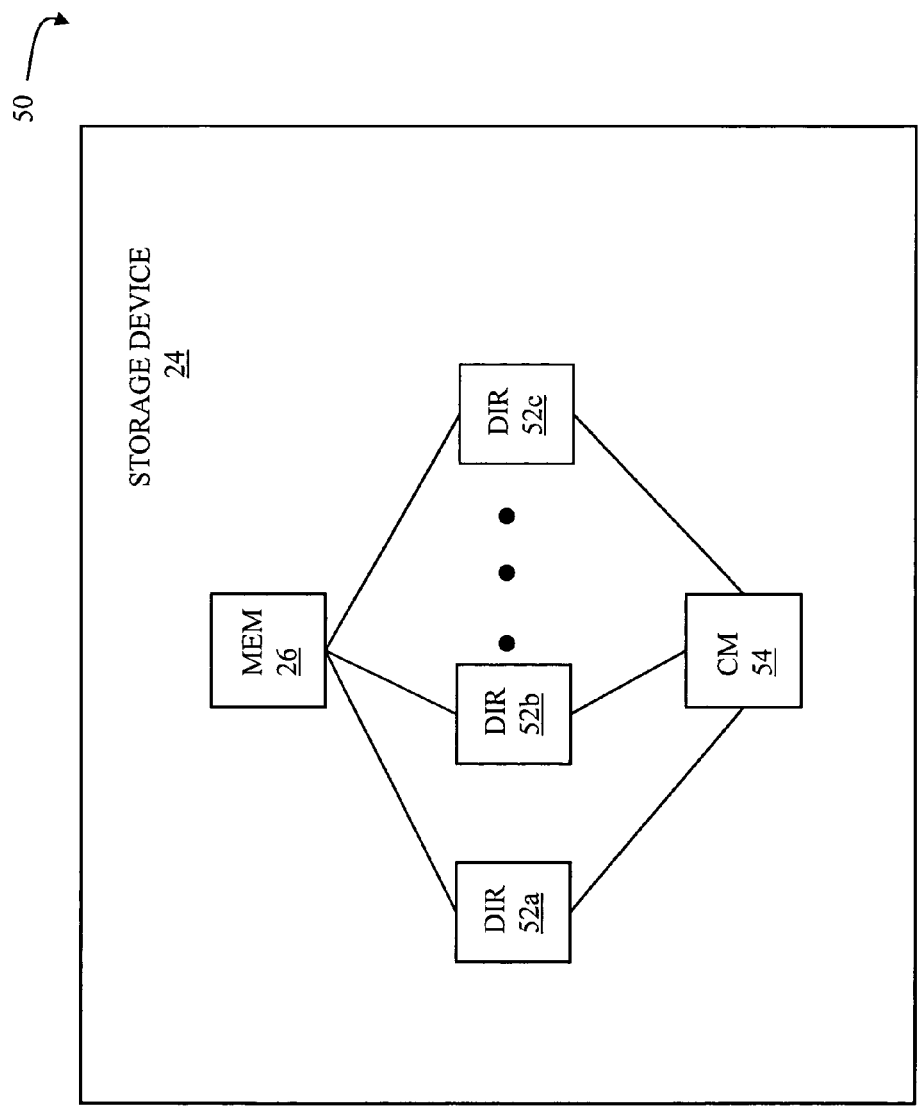
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
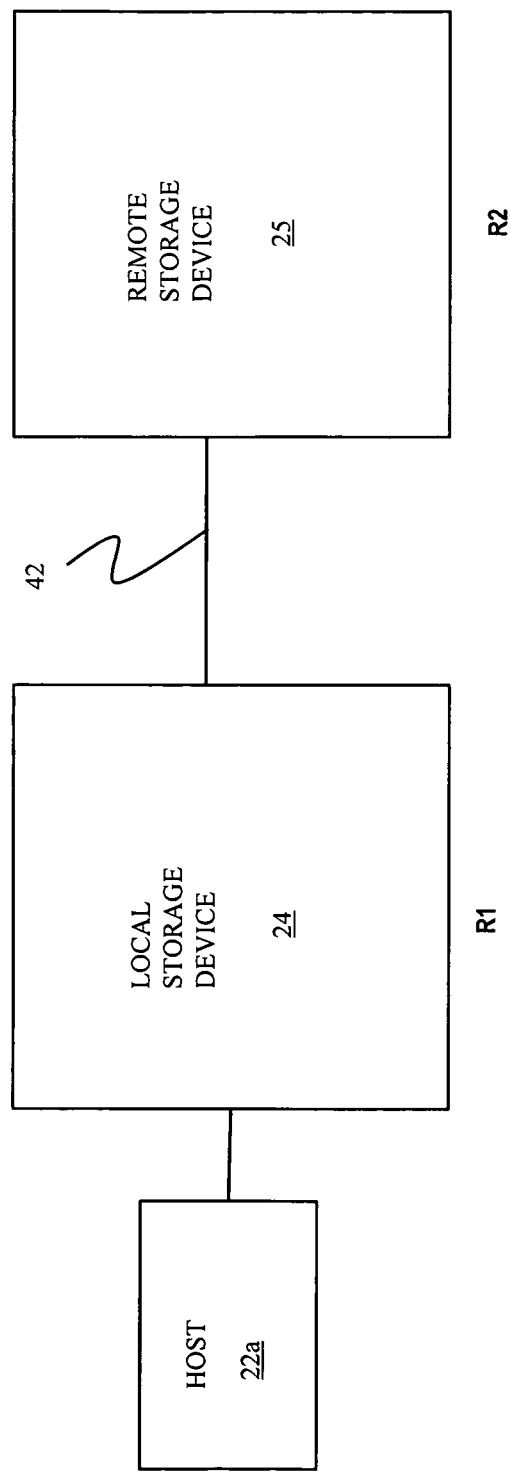
FIG. 3 is a schematic diagram showing a storage system including the storage device, as a local storage device, coupled to a remote storage device via an RDF link that may be used in connection with an embodiment of the system described herein.

FIG. 3 is a schematic diagram showing a storage system including the storage device 24, as a local storage device, coupled to a remote storage device 25 via the RDF link 42. The remote storage device 25 may be the same type of storage device as the storage device 24, and have similar components as described with respect to the storage device 24, and/or may be a different type of storage device. The local storage device 24 and the remote storage device 25 may operate as an RDF product for providing backup and/or mirrored copies of data, as further discussed elsewhere herein. The RDF functionality described herein may be applied so that the data for at least a portion of the disks 36a-36c of the local storage device 24 is copied, using RDF, to at least a portion of similar disks of the remote storage device 25. It is possible that other data of the storage devices 24, 25 is not copied between the storage devices 24, 25 and, thus, the data stored on the storage devices 24, 25 may not be identical.

Providing an RDF mapping between portions of the local storage device 24 and the remote storage device 25 involves setting up a logical device on the remote storage device 25 that is a remote mirror for a logical device on the local storage device 24. One or more of the hosts 22a-c, for example the host 22a, may read and write data from and to the logical device on the local storage device 24 and the RDF mapping causes modified data to be transferred from the local storage device 24 to the remote storage device 25 using the RA's 32a-32c, similar RA's on the remote storage device 25 and the RDF link 42. In steady state operation, the logical device on the remote storage device 25 may contain data that is a copy of, or at least substantially identical to, the data of the logical device on the local storage device 24. The logical device on the local storage device 24 that is accessed by the host 22a may be referred to as the "R1 volume" (or just "R1") while the logical device on the remote storage device 25 that contains a copy of the data on the R1 volume is called the "R2 volume" (or just "R2"). Thus, the host reads and writes data from and to the R1 volume and RDF handles automatic copying and updating of the data from the R1 volume to the R2 volume and/or from the R2 volume to the R1 volume in accordance with the system described herein.

In an embodiment, the system described herein may be used in connection with SRDF synchronous (SRDF/S) transfers. For an SRDF/S transfer, data written from one of the hosts 22a-c to the local storage device 24 may be stored locally, for example on one of the data volumes 36a-c of the local storage device 24. After data is written from one or more of the hosts 22a-c to the local storage device 24, the data is transferred from the local storage device 24 to the remote storage device 25 using RDF. Receipt by the remote storage device 25 is then acknowledged to the local storage device 24 which then provides an acknowledge back to the appropriate one of the hosts 22a-c for the initial write. In other embodiments, the system described herein may also be used in connection with, or in combination with, other modes of data transfer including, for example, asynchronous (SRDF/A) transfers and/or other appropriate data transfer systems and devices.

Tasks executed by a processor of the data storage device 24 of FIG. 1, may be scheduled for execution by software. This software may be included, for example, within the operating system of the storage device 24, or other software which schedules tasks for execution by a processor included in a component, such as one of the HAs 28a-28c or DAs 38a-38c of the data storage device 24. Note, however, that scheduling mechanism described herein has applicability beyond the storage device 24, and may be used in any system where data processing tasks (executable portions of executable code) are scheduled.

Figure 4:
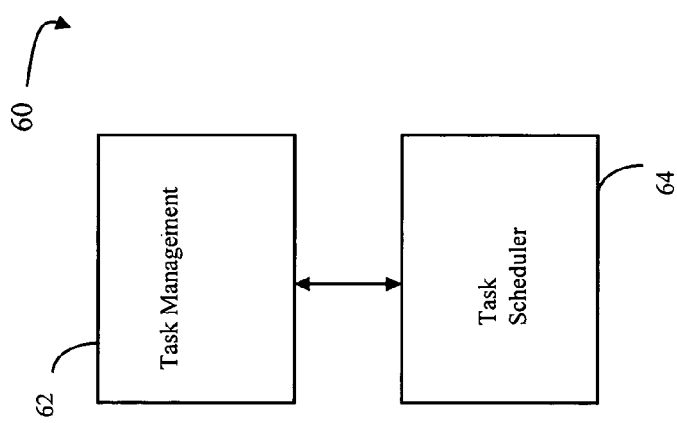
FIG. 4 is a schematic diagram showing software that may be included in a portion of the operating system for task management according to an embodiment of the system described herein.

Referring to FIG. 4, modules 60 that may be used in connection with task management include a task management module 62 that performs functions in connection with creation of task objects or data structures and maintenance of the data structures. The modules also include a task scheduler 64 that performs functions in connection with scheduling a task for execution including, for example, performing context switches as needed to save and restore task state information. The task scheduler may perform scheduling of different user and/or operating system tasks in accordance with different scheduling policies and techniques that may vary. For example, as described in more detail elsewhere herein, it is possible to use a non-priority based scheduling technique so that the scheduling process time remains relatively constant such that the time it takes to schedule any single task for execution for a predetermined time period is at worst linearly scaleable in accordance with the number of tasks.

A task may be in any one or more of a variety of different states that may vary in accordance with each embodiment. One of these states may be a "ready" state in which a task is ready for execution.

Figure 5:
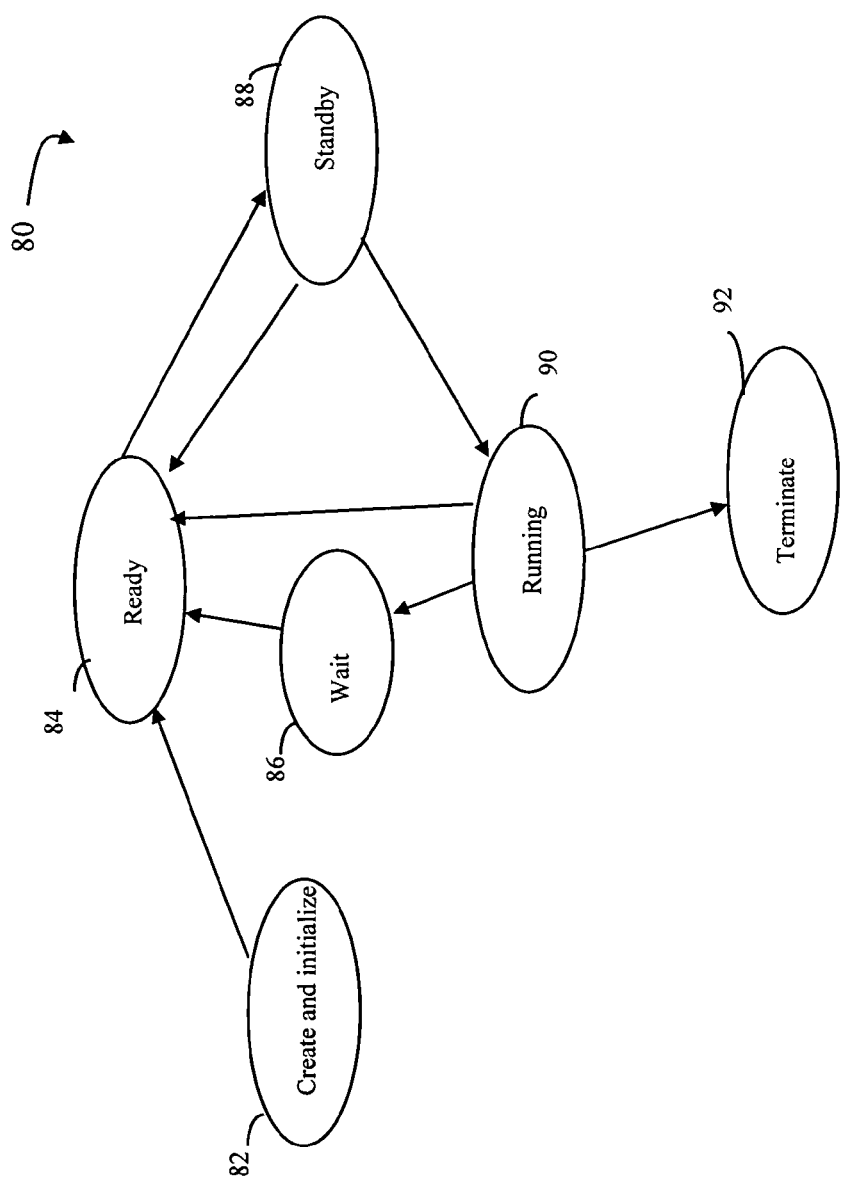
FIG. 5 is a schematic diagram showing a state transition diagram representing the different task states according to an embodiment of the system described herein.

Referring to FIG. 5, a state diagram 80 depicts different task states, including the "ready" task state. The state diagram 80 includes six states and indicates state transitions between the states. At a state 82, a task object or data structure is created and initialized. Subsequently, the task transitions to a ready state 84 ("ready for execution") by, for example, placing the newly created task object in an operating system ready queue or other appropriate data structure. One of the tasks in the ready state 84 may be selected for execution causing the task to transition to a standby state 88. In the present representation of task states, only one task may be in the standby state 88 for each processor. A task may transition to the standby state 88, for example, if the task is caused to run in connection with an interrupt. From the standby state 88, a task transitions to a running state 90 after a context switch is completed to enable the task to execute.

From the running state 90, a task may transition to a wait state 86, the ready state 84, or a terminate state 92. A task may transition to the wait state 86, for example, if the task is waiting for a resource to become available. A task may transition to the ready state 84 from the miming state 90, for example, if a predetermined time period for execution has ended but the task is not done executing. A task may transition to the terminate state 92 upon completion. From the wait state 86 a task may transition to the ready state 84, for example, when a resource that the task is waiting for becomes available.

Tasks in the "ready" state 84 may be included in a data structure referred to as the run list of tasks scheduled for execution.

Figure 6:
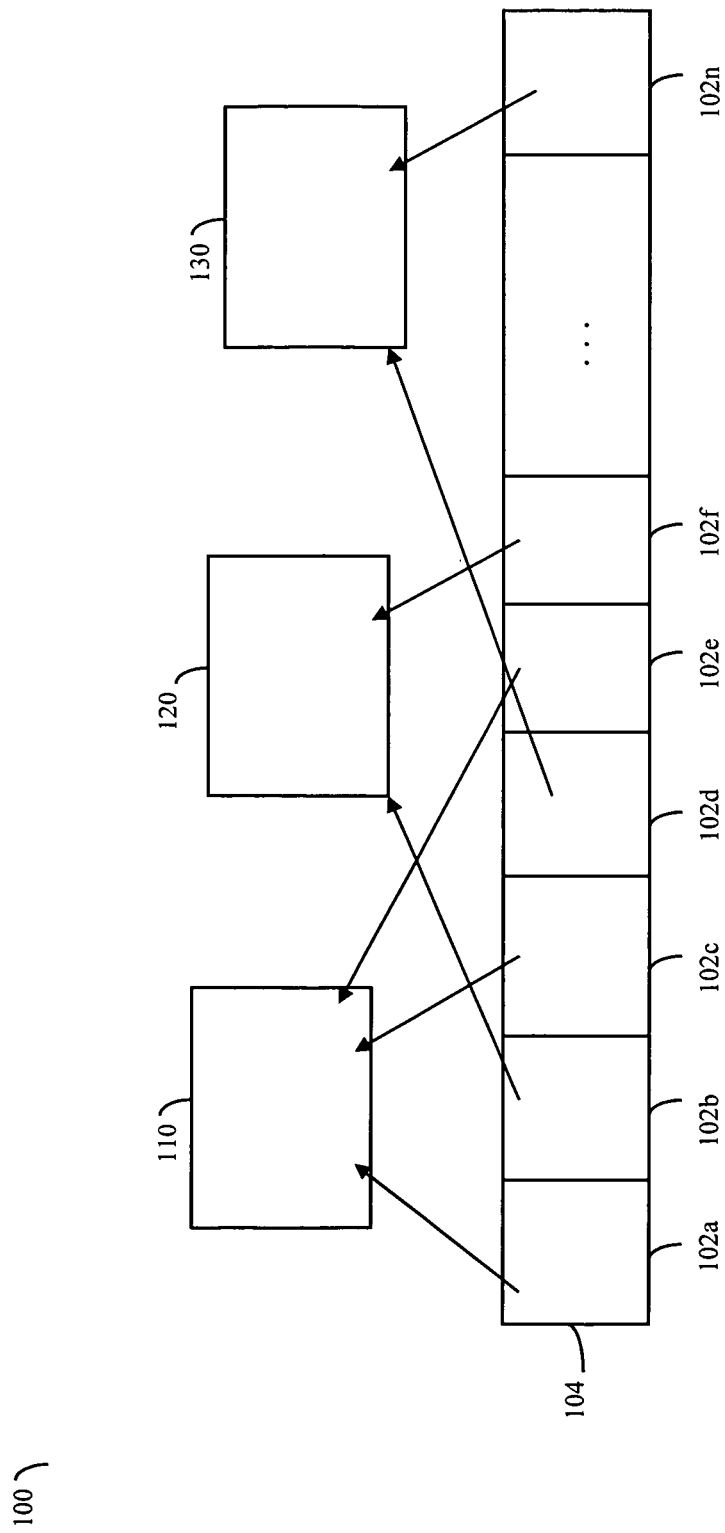
FIG. 6 is a schematic diagram showing a task scheduling list, or run list, of tasks in the ready state according to an embodiment of the system described herein.

Referring to FIG. 6, a diagram 100 illustrates a run list 104 of tasks in a ready state. The list 104 in this example is list of entries 102a-102n. Each of the entries 102a-102n points to an associated task data structure or object, such as the objects 110, 120, 130. Each task structure may be created and initialized by the task management module described elsewhere herein. Each entry of the list 104 identifies a "slice" of time for the associated task to execute. The task scheduler may traverse the list 104 one entry at a time in scheduling tasks for execution. For example, the task 110 associated with the entry 102a may be executing. Upon the task 110 completing execution, the task scheduler performs a context switch loading for execution the context of the task 120 associated with the entry 102b.

It should be noted that a particular task, such as the task 110, may be referenced by a plurality of the entries 102a-102n. The number of entries referencing a particular task determines the number of times the particular referenced task is executed in proportion to other tasks referenced by other entries.

The run list 104 may be determined by allotting a "pie count" to each task. The total "pie count" for all the tasks is represented by the number of entries in the run list 104. The number of entries in the list may be dynamic as the total number of slices may change, for example, when a task starts, completes, or has its pie count reset. In one embodiment, each time a task starts, completes or has its pie count reset, a routine may be called to compute the total number of slices and distribute tasks throughout the run list 104. The number of times each task is referenced by an entry in the list 104 is proportional to the tasks' pie count. The distribution of references to a task in the list 104 is such that a minimum number of intervening tasks may appear between each successive appearance of the same task in the list. In other words, the position of a task within the list with respect to another reference to the same task in the list is in accordance with the particular task's weighting factor. The task's weighting factor may be represented as the ratio of the task's pie count with respect to the total pie count.

In one example, if the pie count is one for each task, the number of entries in the list 104 is equal to the number of tasks in the system and tasks execute in a round-robin manner. In another example, setting a single task's pie count to 2 with all other tasks having a pie count of 1 results in a list having a number of entries equal to the number of tasks+1. The single task having the pie count of 2 may appear once at the start of the list and once again half way through the list. The foregoing are examples regarding the number of entries between successive references to the same task for scheduling in accordance with a task's weighting factor.

The resulting computed run list may be used by the scheduler in scheduling tasks for execution. The use of the foregoing run list may be used to minimize the latency for scheduling task in accordance with a non-priority based manner. The time to schedule any single task is linearly related to the run list size.

It should be noted that the list 104 may be implemented as a single or a doubly linked list. Other embodiments may use other data structures, such as an array. The tasks scheduled for execution using the foregoing techniques may include user tasks as well as other system tasks scheduled such that there is no priority scheme of tasks on the run list.

Figure 7:
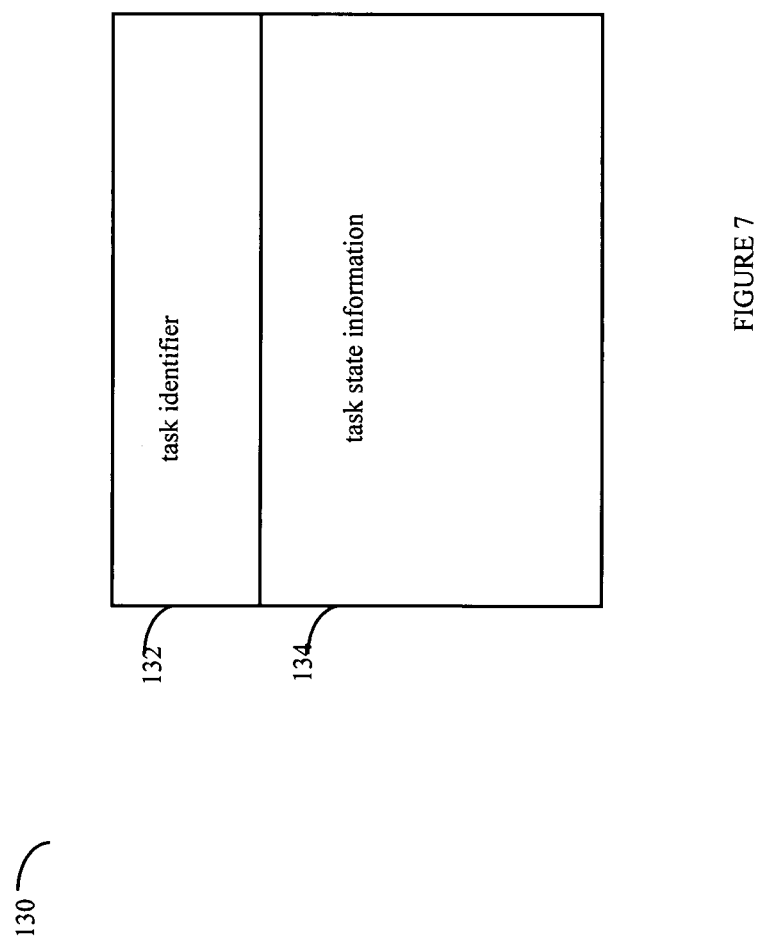
FIG. 7 is a schematic diagram showing a detailed version of a task data structure according to an embodiment of the system described herein.

Referring to FIG. 7, a task data structure or object 130 includes a task identifier field 132 and task state information 134. The task identifier field 132 includes a value that uniquely identifies the task within the operating system, for example. The task state information 134 may include task state information, such as contents of registers, stack and other processor state information necessary to execute the task 120 when task context switches are performed. Other embodiments may include other information within a data structure identifying a particular task.

Figure 8:
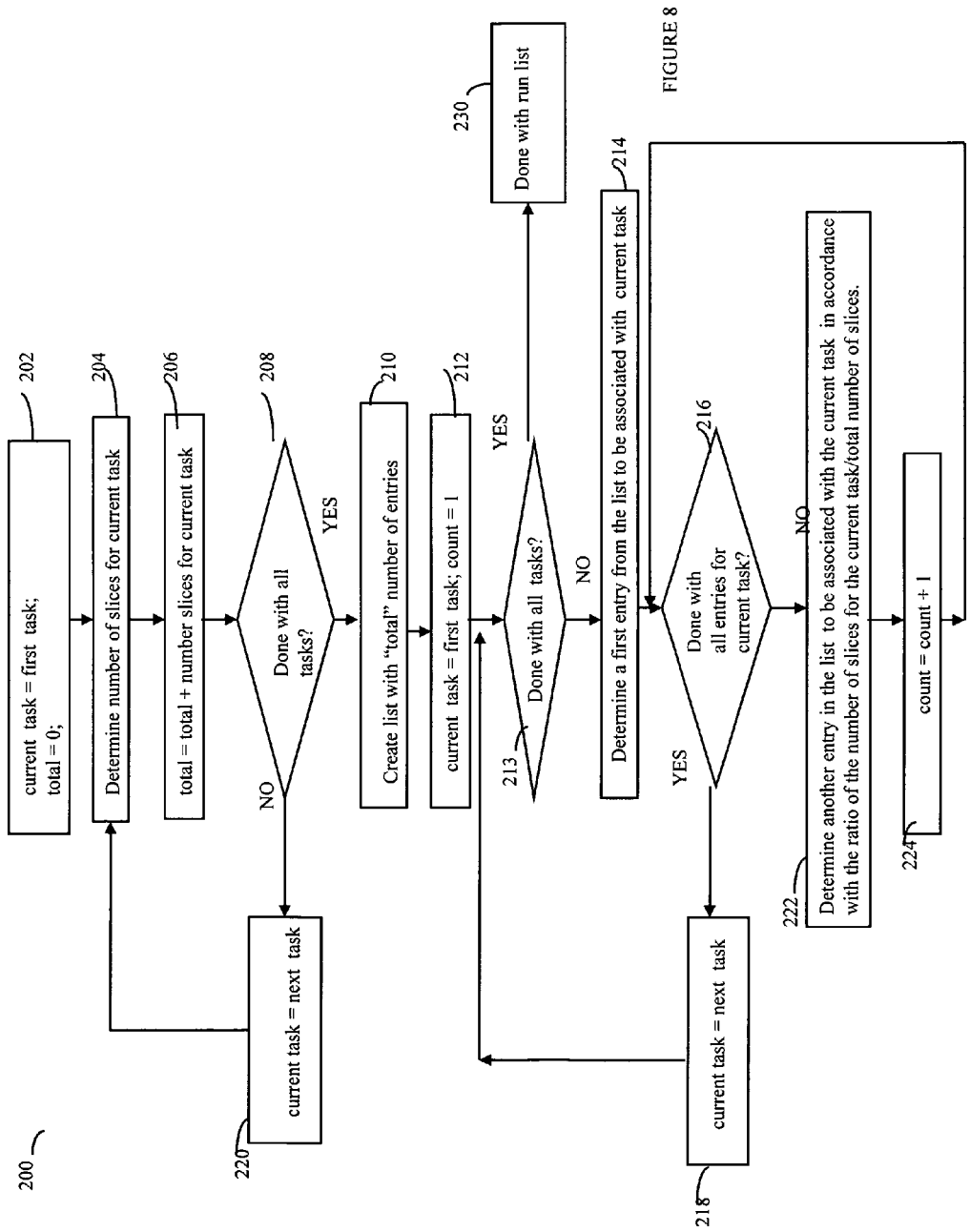
FIG. 8 is a flowchart illustrating determining a run list used by a task scheduler according to an embodiment of the system described herein.

Referring to FIG. 8, a flowchart 200 illustrates steps performed in connection with scheduling tasks for execution. The steps of the flowchart 200 may be performed by the task scheduler described elsewhere herein. At a step 202, the current task is initialized as the first task, and the variable total is assigned the value of zero. Control proceeds to a step 204 where a number of slices for the current task is determined. At a step 206, the total is updated to include the number of additional slices for the current task. Control proceeds to a step 208 where a determination is made as to whether all tasks have been processed. If not, then control proceeds to a step 220 where the current task is assigned the next task to be processed. If, at step 208, a determination is made that all tasks have been processed, then control proceeds to a step 210 where a run list containing "total" entries is created. Current task is initialized to the first task, and the count is initialized to one at a step 212.

At a step 213, a determination is made as to whether all tasks have been processed. If so, then control proceeds to a step 230 where the process of building the run list is complete and the task scheduler may begin executing a task using the run list. Otherwise, if all tasks have not been processed, control proceeds to a step 214 to begin processing the current task.

At a step 214, a first entry in the run list is selected to be associated with the current task. This first entry may be determined using any one of a variety of techniques and/or heuristics. For example, the first entry associated with the current task may be determined randomly, or as the first free entry in the list. At a step 216, a determination is made as to whether all entries for the current task have been initialized. This may be determined by comparing count to the number of slices associated with the current task. If all entries in the list for the current task have been initialized and associated with the current task, then control proceeds to a step 218 where the current task is assigned the next task to be processed. Control proceeds to a step 213 where a determination is made as to whether all tasks have been processed.

If, at a step 216, a determination is made that entry processing of the run list for the current task is not complete, control proceeds to a step 222 where another entry in the run list is selected and associated with the current task. The entry selected at the step 222 may be determined in accordance with a variety of different techniques. For example, the weight of a particular task may be represented as:

number of slices for task/total number of slices

If this ratio is 10/50=1/5, then the next entry selected at the step 222 may be five entries away from the previously selected entry, assuming this entry is free. Otherwise, the next successive entry may be selected. At a step 224, count is incremented by one. This process may be repeated for the current task until ten entries have been selected and associated with the current task. The foregoing is one technique that may be used such that the ratio represents an approximate distribution of the current task with respect to a portion of consecutive entries in the run list. Following the step 224, control proceeds back to the step 216, discussed above.

As discussed above, once the run list 104 is constructed, the task scheduler 64 may traverse the list to provide each of the tasks indicated by the entries 102a-102n an opportunity to run. However, in some cases, it may be desirable to skip one or more of the entries 102a-102n under certain conditions, such as when, prior to being preempted by the task scheduler 64, a task has voluntarily relinquished the slot of time allotted to the task by the task scheduler 64. This is described in more detail below.

Figure 9:
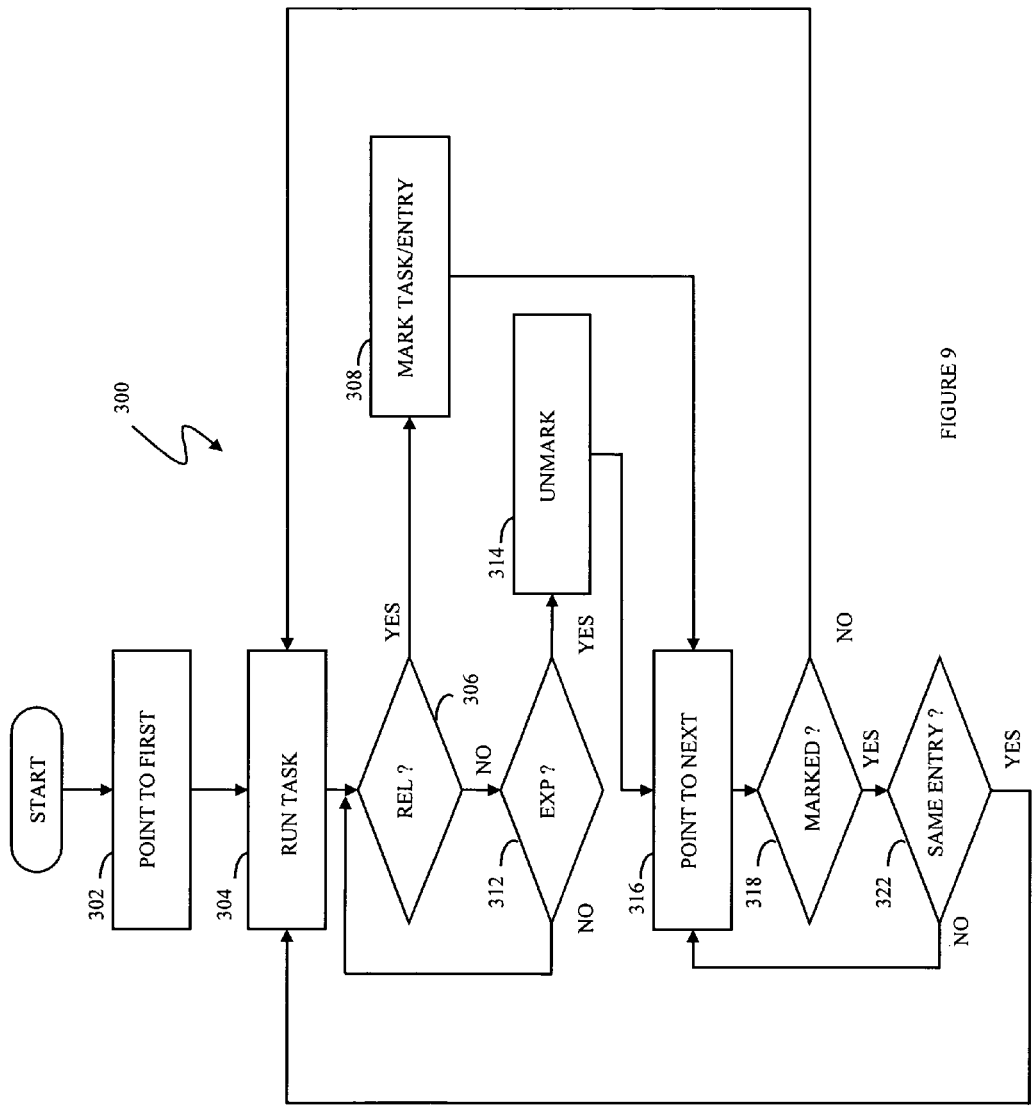
FIG. 9 is a flowchart illustrating traversing a run list according to an embodiment of the system described herein.

Referring to FIG. 9, a flow chart 300 illustrates steps performed by the task scheduler 64 in connection with scheduling tasks from the run list 104. Processing begins at a first step 302 where the scheduler 64 points to the first entry 102a in the run list 104. Following the step 302 is a step 304 where the scheduler 64 runs the task indicated by the entry pointed to in the run list 104, as discussed elsewhere herein. For example, when the step 304 follows directly from the step 302, the task that is run at the step 304 is the task 110 indicated in the first entry 102a in the run list 104. However, for subsequent iterations, a different task may be run at the step 304.

Following the step 304 is a test step 306 where it is determined if the running task has relinquished the slot prior to expiration of the time allotted by the scheduler 64. A task may relinquish a slot prior to expiration for a number of reasons, including the task needing a resource that is currently unavailable, waiting for another process to provide a result, or termination. If it is determined at the step 306 that the task being run has relinquished the slot, then control transfers from the step 306 to a step 308 where both the task (e.g., the task 110) and the entry in the run list 104 (e.g., the entry 102a) are marked for future reference, the purpose of which is described in more detail elsewhere herein. Any appropriate mechanism may be used at the step 308 to mark the task and the entry so that, in subsequent iterations, it is possible to determine that the task and the entry have been previously marked.

If it is determined at the step 306 that the task being run has not relinquished the slot, then control transfers from the step 306 to a test step 312, where it is determined if the running task has exceeded the allotted time (i.e., the time has expired). If not, then control transfers back to the test step 306 for another iteration. Otherwise, control transfers from the test step 312 to a step 314 where the task/entry are unmarked. Note that unmarking the task/entry at the step 314 may not be necessary (if the task/entry were not previously marked), but that, following the step 314, the task/entry will be in an unmarked state. That is, if the current task had been previously marked (i.e., at the step 308), it is unmarked at the step 314.

Following the step 314 is a step 316 where the pointer used to iterate through the run list 104 is incremented. Note that the step 316 is also reached following the step 308. Also note that incrementing the pointer at the step 316 may also include causing the pointer to wrap appropriately. For example, if the pointer is an index variable I, then the operation at the step 316 could be:

$$I=(I+1) \bmod \text{number\_of\_entries}$$

Following the step 316 is a test step 318 where it is determined if the task corresponding to the current pointer has been marked (i.e., at the step 308). If so, then the last time the task executed, it relinquished the slot prior to expiration of the allotted time. On the other hand, if the last time the task ran it used all of the allotted time for the slot (expired) and was preempted by the scheduler, then the task was unmarked at the step 314. It is desirable to allow the task to run again if the task had not previously relinquished the slot. Accordingly, if it is determined at the step 318 that the task is not marked, then control transfers from the test step 318 to the step 304, described above, where the task is run. Otherwise, control transfers from the step 318 to a test step 322 where it is determined if the current entry pointed to in the run list 104 is the same entry from which the task ran the last time in which the task relinquished the slot. As discussed elsewhere herein, a task can correspond to multiple entries in the run list 104. Thus, for example, if the task 110 corresponds to the entries 102a, 102c, 102e in the run list, and the last time the task ran was when the pointer pointed to the entry 102c, then the test at the step 322 would determine if the current pointer corresponds to the entry 102c or not.

If it is determined at the test step 322 that that the entry in the run list 104 is the same entry from which the task had last been run, then control transfers from the test step 322 back to the step 304, discussed above, to run the task. Thus, if a task relinquishes the slot prior to the allotted time, the task is not run again until the pointer cycles through the entire run list 104 and, one again, points to the entry in the run list 104 from which the task had last been run. If, on the other hand, it is determined at the test step 322 that the entry is not the same, then control transfers from the test step 322 back to the step 316, discussed above, where the pointer is incremented.

In some instances it may be possible to have multiple run lists that are allocated a certain percentage of CPU time. That is, instead of the single run list 104 discussed herein, there may be multiple run lists that each perform the processing described herein for a certain percentage of CPU time.

Figure 10:
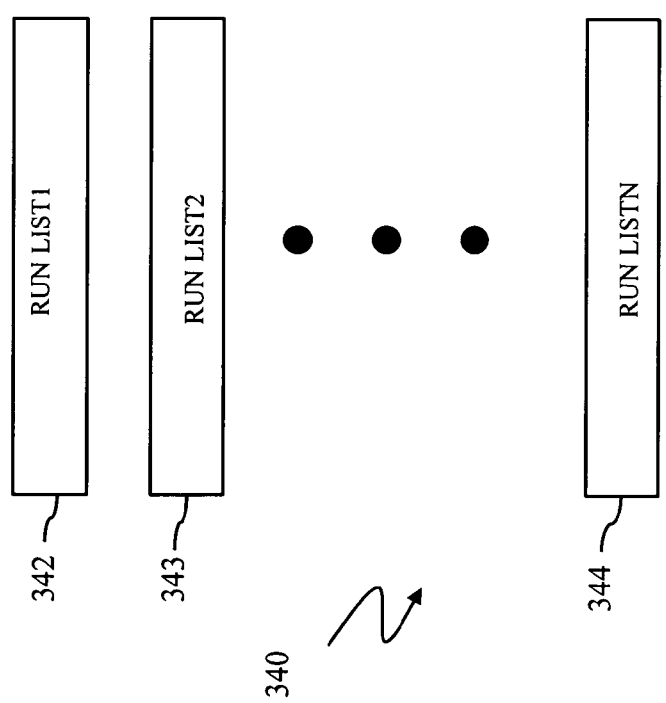
FIG. 10 is a diagram illustrating a plurality of run lists according to an embodiment of the system described herein.

Referring to FIG. 10, a diagram 340 shows a plurality of run lists 342-344. Although only the three run lists 342-344 are shown, the system described herein may use any number of run lists. Each of the run lists 342-344 is like the run list 104 described elsewhere herein and may be used in the same way, except that each of the run lists 342-344 is provided with a percentage of the available CPU time rather than the single run list 104 being given the entire CPU, as discussed above. Of course, each of the run lists 342-344 may include different entries for different tasks than the run list 104. Thus, for example, the run list 342 may include entries for tasks for which no entries exist in the run list 104 and/or the other run lists 343-344. Also, in instances where the entries are for the same tasks (and/or a subset thereof and/or a superset thereof), the weighting factors may be different.

Figure 11:
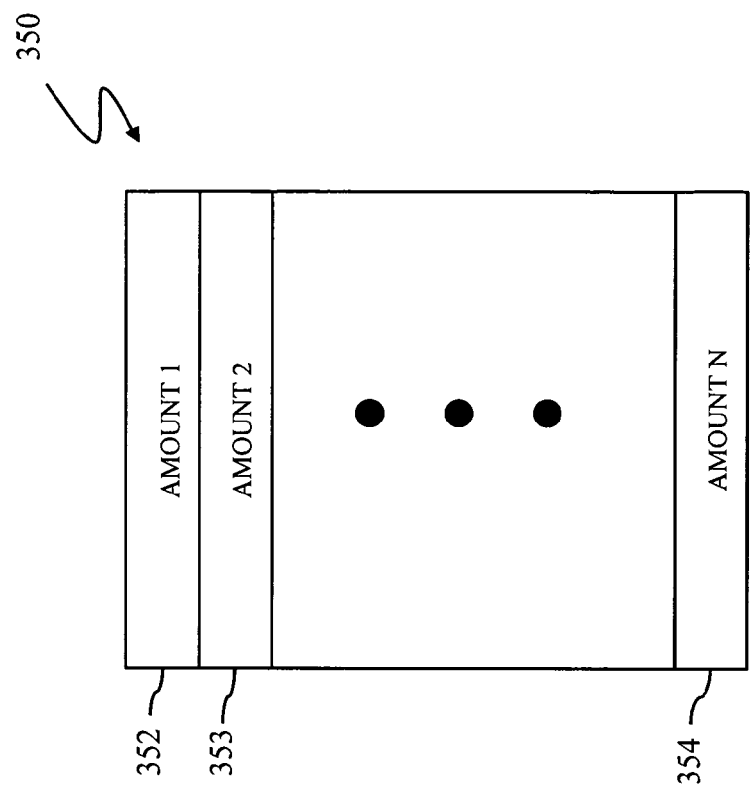
FIG. 11 is a table containing relative run times for a plurality of run lists according to an embodiment of the system described herein.

Referring to FIG. 11, a table 350 indicates a relative amount of CPU time that each of the run lists 342-344 may be provided. The table includes a plurality of elements 352-354, each of which corresponds to one of the run lists such that the element 352 may indicate a relative amount of CPU time for the run list 342, the element 353 may indicate a relative amount of CPU time for the run list 343, and, generally, the element 354 may indicate a relative amount of CPU time for the run list 354. The amount may be expressed in a percentage or may be an amount where the value indicates the amount of CPU. For example, a run list having a corresponding value of x in the table 350 will receive half as much CPU time as a run list having a corresponding value of 2x. Note that the values in the table 350 may be dynamically adjusted based on run time conditions and/or other factors. In some cases one or more of the values may be set to zero (or similar) to indicate that the corresponding one or more of the run lists 342-344 is not to be used at all. Note also that appropriate mechanisms other than the table 350 may be used to provide the same or similar functionality.

Figure 12:
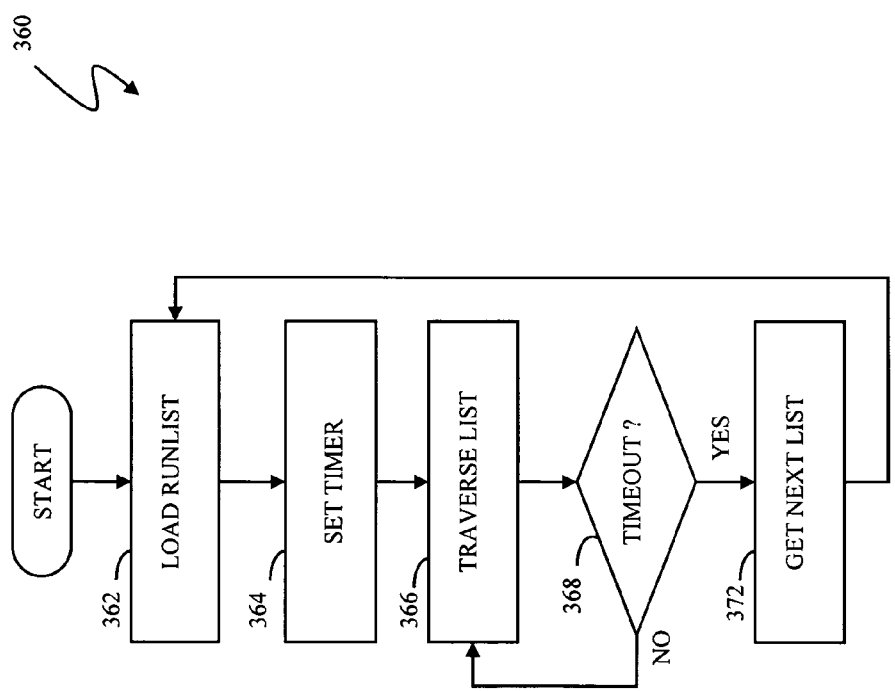
FIG. 12 is a iterating through a plurality of run lists according to an embodiment of the system described herein.

Referring to FIG. 12, a flow chart 360 illustrates steps performed in connection with cycling through the run lists 342-344. Processing begins at a step 362 where one of the run lists is loaded (selected for use). Any appropriate mechanism may be used for this, including adjusting a pointer that points to the loaded one of the run lists 342-344. Following the step 362 is a step 364 where a timer is set according to the value provided in the table 350 for the particular one of the run lists loaded at the step 362. Following the step 364 is a step 366 where the particular one of the run lists loaded at the step 362 is traversed in a manner like that discussed elsewhere herein.

Following the step 366 is a test step 368 where it is determined if the timer set at the step 364 has timed out. The test step 368 represents polling the timer. In other embodiments, it may be possible to use an interrupt mechanism so that the run list is traversed at the step 366 until the timer times out and interrupts the process. If it is determined at the test step 368 that the timer has not timed out, then control transfers from the test step 368 back to the step 366 to continue traversing the loaded run list. Otherwise, if it is determined at the test step 368 that the timer has timed out, then control transfers from the test step 368 to a step 372 where the next one of the run lists 342-344 is fetched. Following the step 372, control transfers back to the step 362, discussed above, for another iteration.

The system described herein allows the grouping of tasks together and providing each grouping a pre-defined amount of CPU time that is guaranteed irrespective of what other tasks in other groups are provided. Thus, it is possible to ensure that CPU intensive/critical tasks receive a minimum of the CPU time. It is also possible to limit tasks which may otherwise monopolize the CPU by placing those tasks into a group and limiting the overall amount of CPU that group is allowed to consume.

The system described herein may be implemented on any appropriate platform. In some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system also includes computer software, in a computer readable medium, that executes any of the steps described herein. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for causing a processor to execute a plurality of tasks, comprising:
   determining a count for each task to be executed;
   determining a total count representing a sum of all counts for all tasks to be included in a run list;
   constructing the run list by distributing corresponding entries for each task within the run list a number of times in accordance with each task's weighting factor, the weighting factor corresponding to a ratio of the each task's count with respect to a total count, wherein at least one of the tasks has more than one corresponding entry in the run list; and executing the tasks in the run list in a round-robin manner, wherein a particular entry in the run list is skipped in response to a corresponding task having relinquished a slot prior to expiration of time allotted for the task to run in the slot the last time the corresponding task was executed and the particular entry not being the entry from which the corresponding task had last been run.

2. The method of claim 1, further comprising:
executing a task in the run list in response to the particular entry being the entry from which the task had been executed when the task previously relinquished the slot prior to expiration of time allotted for the task to run in the slot.

3. The method of claim 1, further comprising:
determining a first position and a second successive position of a first task in the run list such that a minimum number of other tasks intervene between the first position and the second successive position.

4. The method of claim 3, further comprising:
computing an updated total count value replacing the total count upon detection of at least one of: a task start, a task completion and a reset of a task's count.

5. The method of claim 4, further comprising:
distributing, in response to the computing, each task throughout the run list in accordance with the each task's weighting factor using the updated total count value and the each task's weighting factor.

6. The method of claim 5, wherein the run list is used by a task scheduler included in a data storage system of the computer system.

7. The method of claim 5, wherein computing and distributing are performed by invoking a routine.

8. The method of claim 1, wherein the run list is one of: a single and a doubly linked list.

9. The method of claim 1, further comprising:
constructing additional run lists by distributing corresponding entries for each task within the run list a number of times in accordance with each task's weighting factor.

10. The method of claim 9, wherein the run lists are used according to a relative amount of CPU usage set for each run list.

11. Computer software, provided in a non-transitory computer-readable medium, that causes a processor to execute a plurality of tasks, the software comprising:
executable code that determines a count for each task to be executed;
executable code that determines a total count representing a sum of all counts for all tasks to be included in a run list;
executable code that constructs the run list by distributing corresponding entries for each task within the run list a number of times in accordance with each task's weighting factor, the weighting factor corresponding to a ratio of the each task's count with respect to a total count, wherein at least one of the tasks has more than one corresponding entry in the run list; and
executable code that causes the tasks in the run list to be executed in a round-robin manner, wherein a particular entry in the run list is skipped in response to a corresponding task having relinquished a slot prior to expiration of time allotted for the task to run in the slot the last time the corresponding task was executed and the particular entry not being the entry from which the corresponding task had last been run.

12. The computer software of claim 11, further comprising:
executable code that causes a task in the run list to be executed in response to the particular entry being the entry from which the task had been executed when the task previously relinquished the slot prior to expiration of time allotted for the task to run in the slot.

13. The computer software of claim 11, further comprising:
executable code that determines a first position and a second successive position of a first task in the run list such that a minimum number of other tasks intervene between the first position and the second successive position.

14. The computer software of claim 13, further comprising:
executable code that computes an updated total count value replacing the total count upon detection of at least one of: a task start, a task completion and a reset of a task's count.

15. The computer software of claim 14, further comprising:
executable code that distributes, in response to the computing, each task throughout the run list in accordance with the each task's weighting factor using the updated total count value and the each task's weighting factor.

16. The computer software of claim 15, wherein the run list is used by a task scheduler included in a data storage system of the computer system.

17. The computer software of claim 11, wherein the run list is one of: a single and a doubly linked list.

18. The computer software of claim 11, further comprising:
executable code that constructs additional run lists by distributing corresponding entries for each task within the run list a number of times in accordance with each task's weighting factor.

19. The computer software of claim 18, wherein the run lists are used according to a relative amount of CPU usage set for each run list.

* * * * *